April 8, 1930.    E. R. COLLINS ET AL    1,754,083
INSECT EXTERMINATOR
Filed May 10, 1929    3 Sheets-Sheet 3

W. A. Gillentine
E. R. Collins
A. B. Eberhart
INVENTORS

BY Victor J. Evans
ATTORNEY

Patented Apr. 8, 1930

1,754,083

UNITED STATES PATENT OFFICE

EUSTACE R. COLLINS, ALLEN B. EBERHART, AND WILLIAM A. GILLENTINE, OF FORT WORTH, TEXAS

INSECT EXTERMINATOR

Application filed May 10, 1929. Serial No. 362,050.

This invention relates to insect exterminators, and its general object is to provide a machine to be propelled and operated in a field of vegetation, such as cotton, and between the rows thereof to remove insects and the like from the plants and cause them to be disposed in the path of burners of the machine whereby the insects and the like will be destroyed by streams of burning fuel from the burners and without injury to the plants by heat or otherwise.

Another object of the invention is to provide an insect exterminator with burner casings that include insulating material so that the casings will hold heat and prevent the same from injuring the plants, yet the casings are shaped to direct flame and heat where it will do the most good.

A further object of the invention is to provide an insect exterminator that includes burner casings, each having a plurality of individually controlled burners, whereby one or more burners can be used as desired.

A still further object of the invention is to provide an exterminator of the character set forth that is light in weight, simple in construction, inexpensive to manufacture, and is efficient in operation and service.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 2:
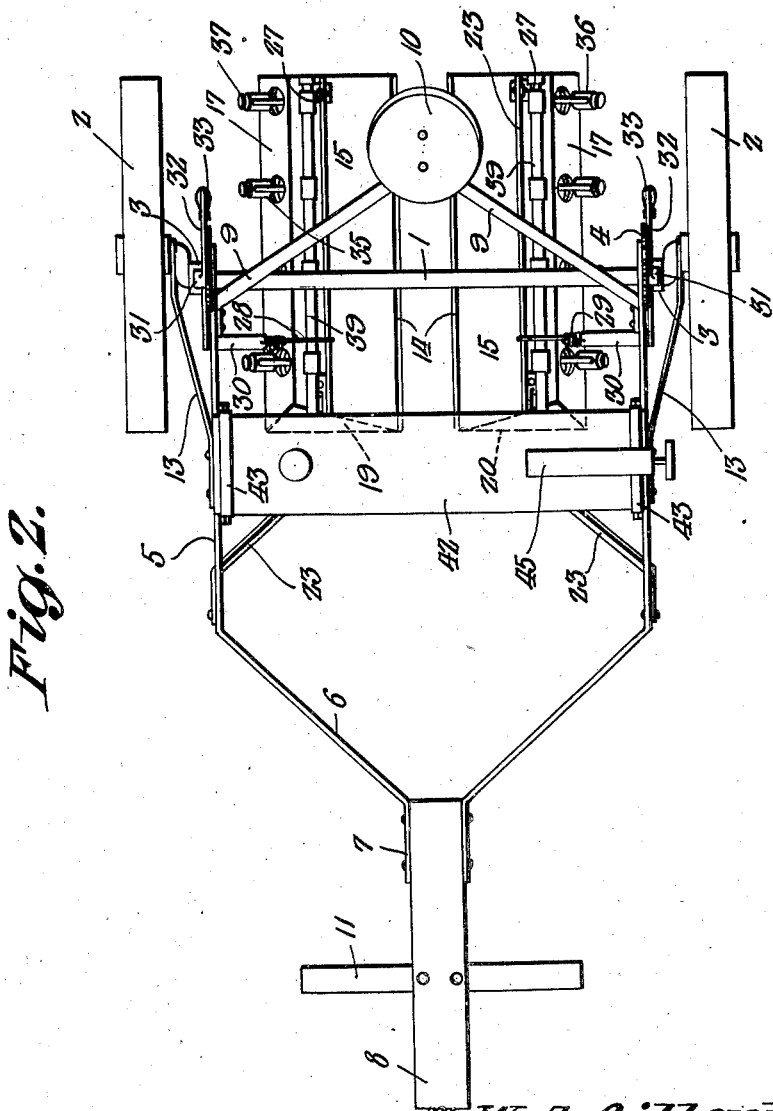
Figure 2 is a top plan view thereof.
Figure 3:
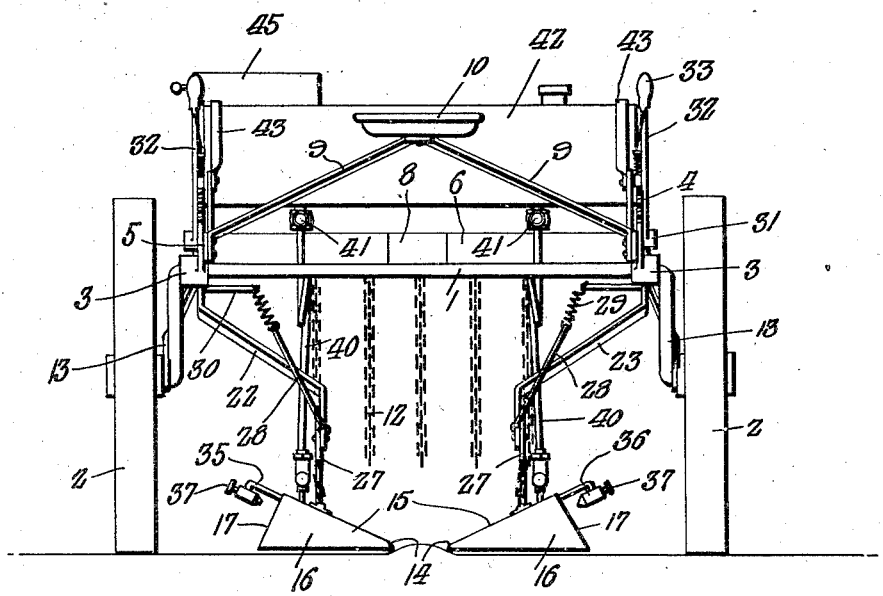
Figure 3 is a rear elevation.

Referring to the drawings in detail, the reference numeral 1 indicates an arched axle which as best shown in Figure 3 is substantially U-shaped and terminates at its ends to provide spindles to receive the ground engaging wheels 2. Secured to the arched axle and at the opposite ends thereof are brackets 3 terminating at their upper ends in notched quadrants 4 for a purpose which will be later described, and fixed to these brackets upon the inner sides thereof are the rear ends of parallel portions 5 of a frame which has its forward ends bent to provide converging portions 6 which terminate in parallel ears 7 as best shown in Figure 2. These ears receive the rear end of the tongue 8 and are secured thereto thru the medium of bolts or the like as shown.

Secured adjacent to the rear ends of the parallel portions 5 are upwardly inclined supporting bars 9 which have their upper ends disposed together for the purpose of supporting a seat 10, and the bars 9 also extend rearwardly of the frame for the purpose of disposing the seat accordingly.

Secured to the inner side of the tongue adjacent its rear end is a strip 11 that extends a considerable distance upon the opposite sides of the tongue, and depending from the strip in spaced parallel relation with respect to each other, and secured thereto accordingly is a plurality of chains 12 which are primarily adapted for engagement with the plants to remove insects and the like therefrom when the machine is travelling thru a field of vegetation. The machine may be propelled by any well known means such as draft animals, a tractor or the like, and this means may be associated with the tongue in any well known manner.

Brace bars 13 are provided for the frame, and these bars have their upper ends fixed to the parallel portions 5 and the lower ends secured to the spindles as best shown in Figure 2.

Figure 1:
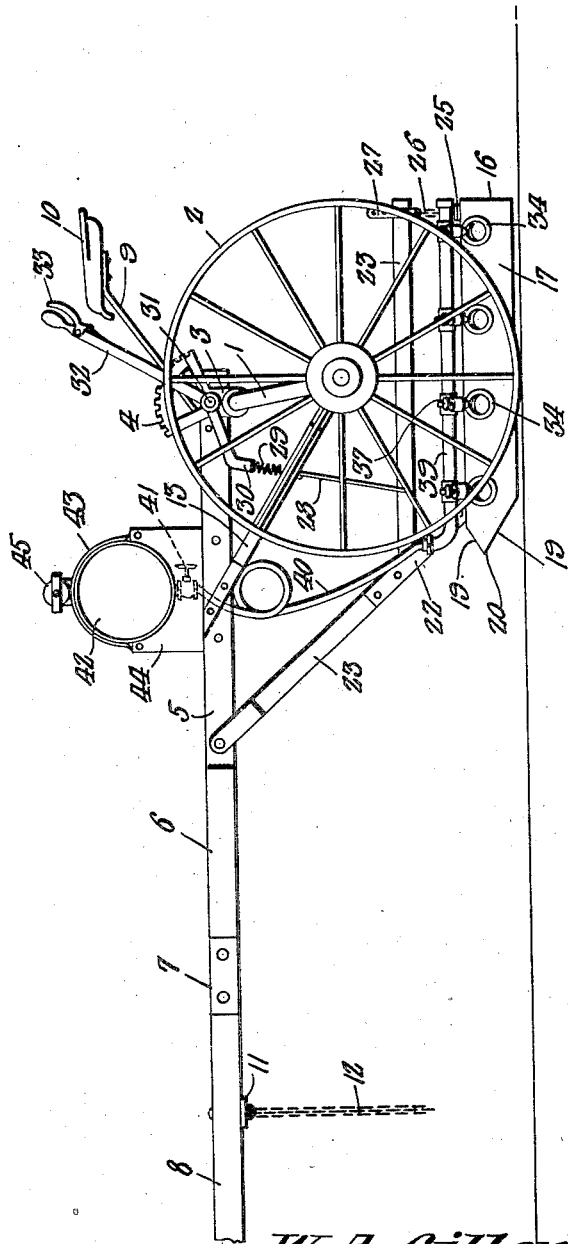
Figure 1 is a side elevation of a machine constructed in accordance with our invention.
Figure 4:
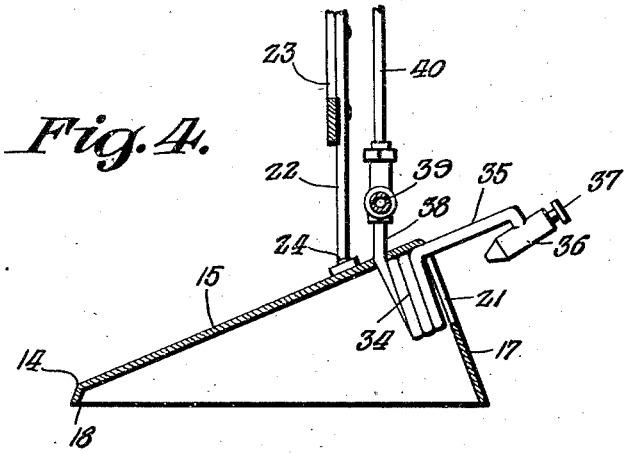
Figure 4 is an approximately sectional view taken thru one of the burner casings and showing the position of one of the burners with respect thereto.

The burner casings which are indicated by the reference numeral 14 are preferably made up of two sheets of metal, with a sheet of asbestos between the same so that the casings will retain their heat for a maximum period of time, and these casings which are arranged in pairs as best shown in Figure 2, are provided with inwardly inclined top walls 15, straight rear walls 16, outwardly inclined outer walls 17 which are relatively wide as shown in Figure 4, and extremely narrow inner walls 18, due to the shape of the casings and the top walls thereof. The upward walls 19 of the burner casings converge toward each other and terminate in an edge 20 as shown in Figure 1. The casings are disposed so that their inner walls 18 are arranged in spaced relation with respect to each other as best shown in Figure 3, and the outer walls are provided with openings 21 arranged in parallel relation with respect to each other. The casings are adjustably supported with respect to the frame and for this purpose we provide downwardly and inwardly extending arms 22 that have their upper ends secured to the outer sides of the parallel portions 5 and the lower ends which are disposed in parallelism, have secured thereto the forward ends of rearwardly extending supporting bars 23, and the lower ends of the arms 22 are fixed to the casings as at 24.

The arms 22 as above set forth are secured to the forward ends of the casings, while secured to the rear ends of the casings is a hook bracket 25 which receives one of the end links of chains 26, and the upper end links of the chains 26 are secured to links 27 that are provided with a plurality of openings for the purpose of being adjustably secured to the rear end of the rearwardly extending supporting bars 23 thru the medium of bolt and nut connections passing thru any one of the openings of the links, as suggested in Figure 1. By this construction, it will be apparent that the rear ends of the casings can be adjusted with respect to the ground, and in order to raise and lower the casings, we provide rods 28 that have their lower ends secured to the extending bars 23 adjacent the forward ends thereof, and their upper ends are received by coil springs 29 which are in turn secured to the lower ends of arms 30 that are formed with bearings surrounding and mounted for rotation on stub shafts 31 formed with the notched quadrants 4 as shown in Figure 1. These bearings also have formed therewith levers 32 that terminate in handles and have secured adjacent the handle ends thereof gripping levers 33 which control latching bolts to be received in the notches of the notched quadrants whereby the casings may be raised and lowered and held in any adjusted position desired.

Arranged in each casing and adjacent each opening therein are burner coils 34 which have formed therewith and extending thru the openings sections 35 with burner nozzles 36 secured thereto. The burner nozzles are controlled by valves having finger handles 37, and the coils have formed therewith and rising therefrom the sections 38 secured to and in communication with pipe sections 39, there being one pipe section 39 for the burners of each casing as shown in Figure 2, and these pipe sections 39 have their rear ends closed, while their forward ends are upwardly directed to receive the lower ends of tubes 40 that have their upper ends connected with valves 41 which are connected with a tank.

The tank 42 is supported by the frame and secured thereto by bands 43 carried by upright brackets 44, and the tank 42 is provided with a filling spout, and a pump 45 whereby air may be supplied thereto as will be apparent.

From the above description and disclosure of the drawings, it will be obvious that we have provided an exterminator for killing insects and the like, and the exterminator can be used in fields of vegetation and between the rows thereof to remove the insects from the plants, and thence destroy them by streams of burning fuel from the burners. Due to the shape of the casings and the arrangement thereof, it will be apparent that the heat will not only be confined where it will do most good, but the heat will in no way affect the plants.

The machine will also act to burn weeds, small vegetation and the like between the rows, and with its insect destroying properties, the plants will grow without interference from these destructive elements.

It is thought from the foregoing description that the advantages and novel features of our invention will be readily apparent.

We desire it to be understood that we may make changes in the construction, and in the combination and arrangement of the several parts, provided that such changes fall within the scope of the appended claim.

What we claim is:—

An insect exterminator comprising a wheeled frame, a driver's seat supported thereby, a tongue for said frame, means carried by said tongue for removing insects from plants, burner casings carried by said frame and adjustably mounted with respect thereto, means for adjusting the casings from the driver's seat, said casings including inwardly directed downwardly inclined top walls, outwardly inclined outer walls provided with openings arranged in parallelism and with respect to each other, burners carried by said casings and including burner coils disposed therein adjacent the openings thereof, burner nozzles included in said burners and disposed exteriorly of the casings to direct flames thru the openings and coils, and means for supplying fuel to the burners and carried by said frame.

In testimony whereof we affix our signatures.

EUSTACE R. COLLINS.
ALLEN B. EBERHART.
WILLIAM A. GILLENTINE.